Apr. 17, 1923.
J. C. FRENCH
TRACTOR WHEEL CHAIN
Filed March 18, 1918
1,451,872
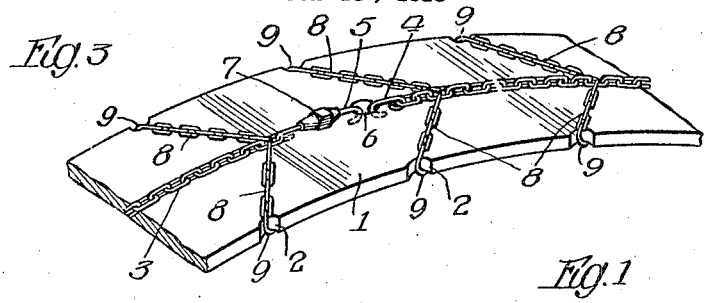
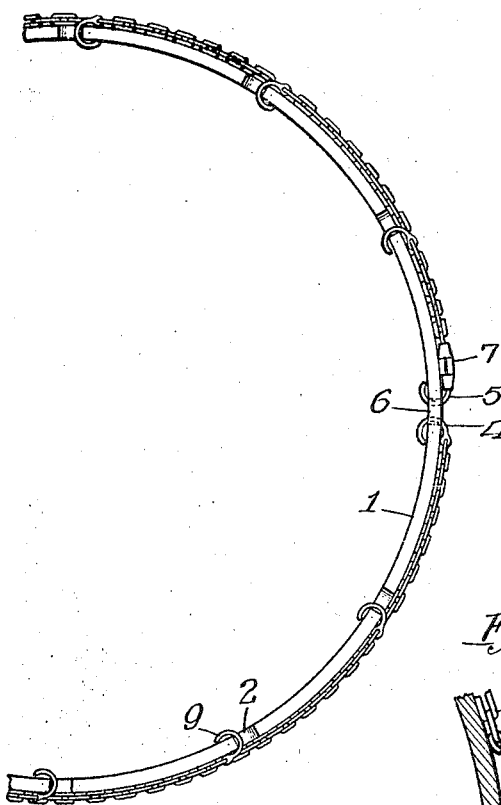
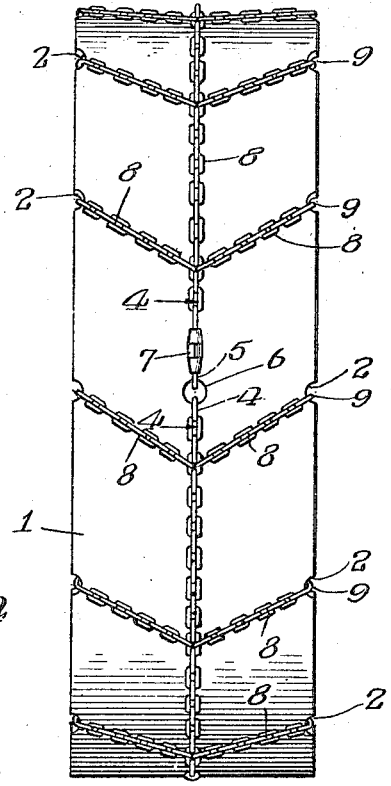
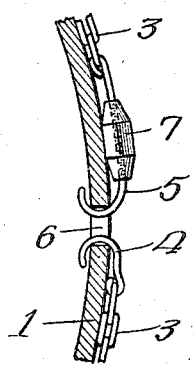
Inventor
James C. French
By Arthur K. Durand
Atty.

Patented Apr. 17, 1923.

1,451,872

UNITED STATES PATENT OFFICE.

JAMES C. FRENCH, OF CHICAGO, ILLINOIS, ASSIGNOR, BY MESNE ASSIGNMENTS, TO F. C. AUSTIN MACHINERY COMPANY, A CORPORATION OF ILLINOIS.

TRACTOR-WHEEL CHAIN.

Application filed March 18, 1918. Serial No. 223,006.

*To all whom it may concern:*

Be it known that I, JAMES C. FRENCH, a citizen of the United States of America, and resident of Chicago, county of Cook, and State of Illinois, have invented a certain new and useful Improvement in Tractor-Wheel Chains, of which the following is a specification.

This invention relates to chains for use on the traction wheels of motor vehicles, and more particularly to those for use on the flat rims of heavy tractor wheels, but the invention is not limited to any particular use.

Generally stated, the object of the invention is to provide a novel and improved traction wheel chain to prevent skidding and to increase the traction of the wheel on the ground.

A special object is to provide an improved construction and arrangement whereby a chain of this kind may be applied to a metal rim and easily attached thereto and detached therefrom.

It is also an object to provide certain details and features of construction and combinations tending to increase the general efficiency and desirability of a traction wheel chain of this particular character.

To the foregoing and other useful ends, the invention consists in matters hereinafter set forth and claimed.

In the accompanying drawings:—

Figure 1 is a front elevation of a traction wheel provided with a chain arrangement embodying the principles of the invention.

Figure 2 is a side elevation of the wheel and chain shown in Figure 1, with a portion thereof shown broken away for convenience of illustration.

Figure 3 is a perspective of a portion of the wheel rim, showing the chain applied thereto.

Figure 4 is an enlarged detail section on line 4—4 in Figure 1.

As thus illustrated, the invention comprises a wheel rim 1 having a flat tread and provided at both edges thereof with notches 2 for the attachment of the traction chain. The said traction chain comprises a circumferential centrally located chain section 3, provided at its opposite ends with hooks 4 and 5 to engage the opening 6 in the tread of the wheel rim, and having a turn-buckle 7 by which to tighten this chain section circumferentially of the wheel. The short oblique chain sections 8 are suitably attached to the circumferential chain section 3 and have their ends provided with hooks 9 to firmly engage the notches 2, whereby the whole chain arrangement is held taut and firmly in place on the flat tread of the wheel rim.

With this construction, it will be seen that the chain sections provide the flat tread of the wheel rim with a central circumferential ridge, and with obliquely arranged ridges, so that the tread is in effect roughened to improve the tractive action thereon. If desired, the turn-buckle 7 can be adjusted to loosen the chain, and the different sections can be readily unhooked from the notches 2, and from the opening 6, in a manner that will be readily understood, and in this way the wheel can be used with a smooth tread when necessary or desirable. The chain is easily applied to the wheel, by engaging the hooks 9 in the notches 2, and by engaging the hooks 4 and 5 in the opening 6, and by then tightening the turn-buckle 7 until the chain is perfectly tight and firm on the wheel. This arrangement tends to prevent skidding, as well as to increase the tractive effect of the wheel when in operation.

The wheel rim 1 is, of course, of solid or non-yielding material, such as iron or other metal, but the chain sections 3 and 8 support the tread on the ground, to prevent skidding and improve the tractive effect thereof. However, when the tractor or other machine upon which the wheel is employed is traveling on a hard pavement, for example, then the chain arrangement can be readily disconnected, so that the hard and smooth and flat tread of the wheel may travel directly on the hard and smooth surface of the street, without jolting or vibration, and hence the provision of means whereby the chain sections can be readily detached from the wheel. When in use, the circumferential chain section 3 supports the tread on the ground, and the laterally extending chain sections 8 do the same, and the wheel tread thus practically roughened will afford the requisite traction on soft or slippery ground.

What I claim as my invention is:—

The combination of a traction wheel having a flat tread, with notches in the side edges of said tread, and an opening in the tread between the side edges thereof, a circumferential chain section extending around the tread, in position to protrude from the tread and enter the ground hooks on the opposite ends of said chain section to engage said opening, means to tighten the chain section circumferentially of the wheel, laterally extending chain sections secured at intervals to the circumferential chain section, and hooks on the ends of said laterally extending chain sections to engage said notches.

Signed by me at Chicago, Cook County, Illinois, this 8th day of March, 1918.

JAMES C. FRENCH.